(12) United States Patent
Weiss et al.

(10) Patent No.: US 8,078,516 B1
(45) Date of Patent: Dec. 13, 2011

(54) METHOD AND SYSTEM FOR MANAGING FINANCIAL DATA

(75) Inventors: Benjamin R. Weiss, Portola Valley, CA (US); James R. Del Favero, Redwood City, CA (US); Todd Matthew Fitch, Santa Clara, CA (US); George A. Hansen, Danville, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 12/140,700

(22) Filed: Jun. 17, 2008

(51) Int. Cl.
*G06Q 40/00* (2006.01)
(52) U.S. Cl. ............................................ 705/35; 705/39
(58) Field of Classification Search ...................... 705/35
See application file for complete search history.

(56) References Cited

U.S. PATENT DOCUMENTS

| | | | |
|---|---|---|---|
| 5,761,661 A * | 6/1998 | Coussens et al. ...................... 1/1 |
| 7,050,997 B1 * | 5/2006 | Wood, Jr. ..................... 705/36 R |
| 7,085,819 B2 * | 8/2006 | Bright et al. .................. 709/217 |
| 7,117,172 B1 * | 10/2006 | Black ............................... 705/35 |
| 7,383,223 B1 * | 6/2008 | Dilip et al. ...................... 705/39 |
| 2005/0177517 A1 * | 8/2005 | Leung et al. .................... 705/64 |
| 2006/0190351 A1 * | 8/2006 | Dennis ............................ 705/26 |
| 2008/0301041 A1 * | 12/2008 | Bruk ............................... 705/39 |

* cited by examiner

*Primary Examiner* — Thomas Dixon
*Assistant Examiner* — Benjamin S Fields
(74) *Attorney, Agent, or Firm* — Osha • Liang LLP

(57) ABSTRACT

A method for managing financial data involves parsing a digital file to obtain metadata describing the digital file, where the digital file includes financial data. The method further involves importing the digital file to a financial management application, identifying a record in the financial management application that is associated with the digital file, based on metadata describing the digital file, and linking the digital file to the record in the financial management application.

14 Claims, 4 Drawing Sheets

METHOD AND SYSTEM FOR MANAGING FINANCIAL DATA

BACKGROUND

In their day-to-day lives, people receive many different types of information that they may like to store somewhere. For example, people often receive receipts, financial statements, bills (for example, energy bills, telephone bills, etc.), medical statements, instruction manuals, and many other different types of information. This information may be received in a variety of different formats, and people often do not have an organized way of storing and tracking the information. For example, some information may be received in digital format, and some information may be received in paper format. Traditionally, people simply print out digital information and store the printout in a binder, file folder, or simply a stack of paper on a shelf. Such physical storage may be easily become lost or disorganized. Further, when the information is needed, it may be difficult to locate the information.

SUMMARY

In general, in one aspect, the invention relates to a method for managing financial data. The method comprises parsing a first digital file to obtain metadata describing the first digital file, wherein the first digital file comprises financial data, importing the first digital file to a financial management application, identifying a first record in the financial management application that is associated with the first digital file, based on metadata describing the first digital file, and linking the first digital file to the first record in the financial management application.

In general, in one aspect, the invention relates to a computer system. The computer system comprises a processor, a memory associated with the processor, and an import engine resident in the memory and executing under control of the processor. The import engine is configured to parse a first digital file to obtain metadata describing the first digital file, wherein the first digital file comprises financial data, import the first digital file to a financial management application, identify a first record in the financial management application that is associated with the first digital file, based on metadata describing the first digital file, and link the first digital file to the first record in the financial management application.

In general, in one aspect, the invention relates to a computer readable medium comprising executable instructions for managing financial data under control of a processor. The executable instructions comprise instructions to parse a first digital file to obtain metadata describing the first digital file, wherein the first digital file comprises financial data, import the first digital file to a financial management application, identify a first record in the financial management application that is associated with the first digital file, based on metadata describing the first digital file, and link the first digital file to the first record in the financial management application.

Other aspects of the invention will be apparent from the following description and the appended claims.

DETAILED DESCRIPTION

Figure 1:
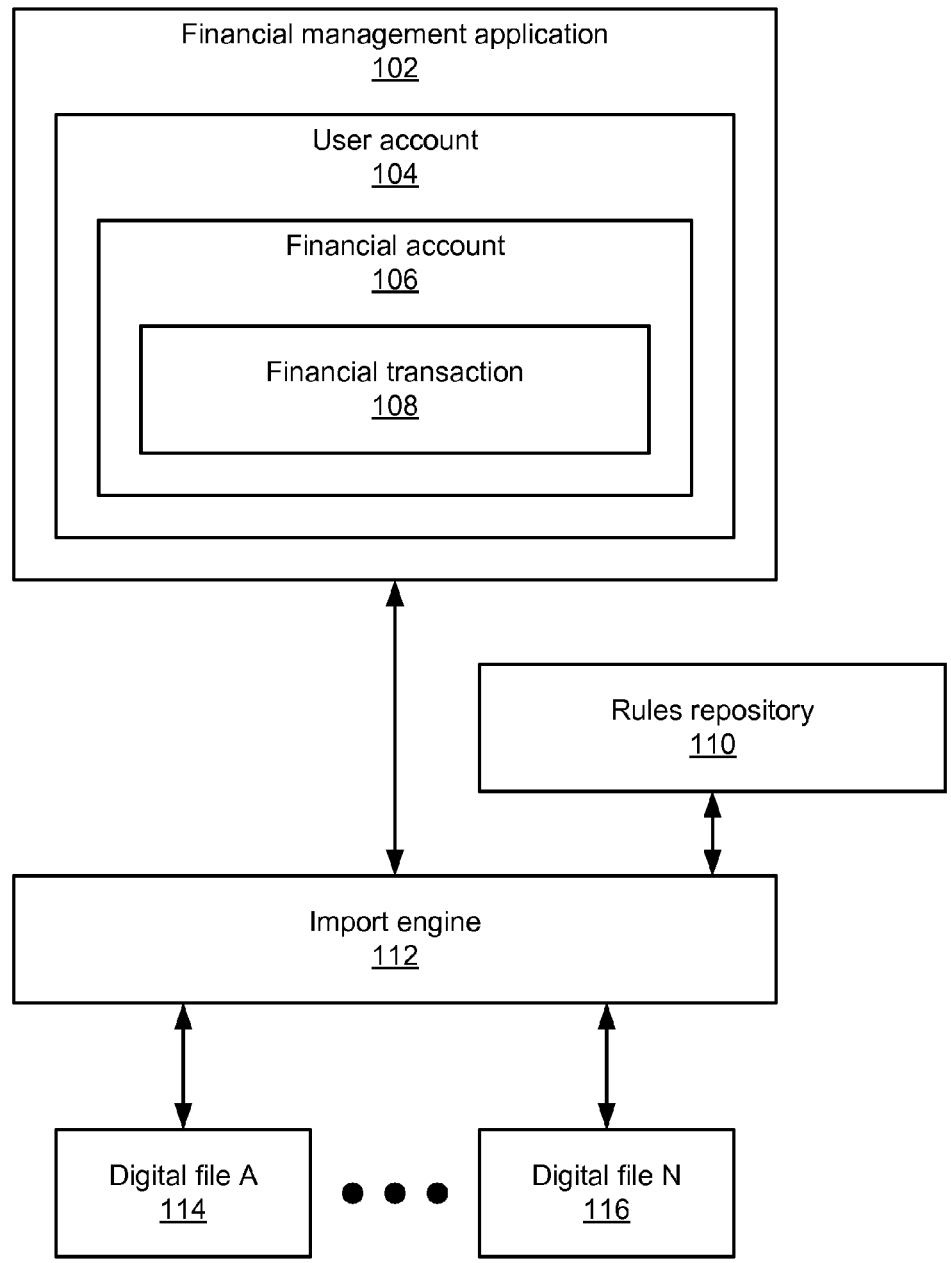
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing financial data. A digital file that includes financial data is parsed to obtain metadata describing the digital file. The digital file is then imported to a financial management application and linked to a record in the financial management application based on the metadata.

FIG. 1 shows a diagram of a system in accordance with one or more embodiments of the invention. In one or more embodiments of the invention, the system includes a financial management application (102). The financial management application (102) is configured to manage financial data for one or more users (i.e., individuals, families, and/or businesses). The financial management application (102) may be a stand-alone application operating on a user's computer or may be a web-based application accessible using a web browser. In some cases, the financial management application (102) may include a combination of stand-alone and web-based features. For example, a stand-alone application may be configured to communicate with a back-end server providing shared services to multiple instances of the financial management application (102).

In one or more embodiments of the invention, the financial management application (102) includes a user account (104) with which financial data are associated. For the purposes of this discussion, a "user account" is a logical construct that is internal to the financial management application (102) and used to organize data for a particular user or a defined group of users. The financial management application (102) may include multiple user accounts for multiple users. For example, different members of a family or different business groups may have different user accounts in the financial management application (102).

In one or more embodiments of the invention, the user account (102) includes a financial account (106). The financial account (106) includes information about a user's finances (for the purposes of this discussion, the term "user" may also refer to a business, a business group, or a representative thereof). For example, the financial account (106) may include information about a credit card, a checking account, a savings account, a brokerage account, a stock portfolio, or any other type of financial account. In one or more embodiments of the invention, the financial management application (102) obtains information for the financial account (106) directly from financial institutions, using an electronic connection such as the Internet. In some cases, financial data may also be entered into the financial management application (102) manually. Further, the user account (102) may include multiple financial accounts.

Further, in one or more embodiments of the invention, the financial account (106) includes a financial transaction (108). The financial transaction (108) describes a transaction that has occurred for the financial account (106), such as a credit, debit, interest paid or received, capital gains or losses, or any other type of transaction. For example, if the financial account (106) is a credit card account, the financial transaction (108) may include information about a purchase made using the credit card, such as the location, amount paid, date of payment, and/or any other type of information about the transaction. Many different types of information may be included in the financial transaction (108).

In one or more embodiments of the invention, the financial management application (102) is configured to link digital files (e.g., digital file (114), digital file (116)) with records in the financial management application (102). For the purposes of this discussion, a "record" may refer to a user account (104), a financial account (106), or a financial transaction (108). Thus, the financial management application (102) may be configured to link digital files to one or more of the aforementioned types of records.

For the purposes of this discussion, "linking" means generating an association between a digital file and a record in the financial management application (102), in a manner that makes the association visible to a user of the financial management application (102). For example, linking the digital file to the record may involve placing a hyperlink or icon for the digital file next to a username, an account number, or a line item representing a financial transaction. Many different representations of the linking are possible. Generally speaking, the linking provides a way for a user to know that the digital file is associated with the record, and to access the digital file in the context of viewing the record using the financial management application (102). Linking may also be used to assign categories to digital files. For example, a digital file may be linked with the category "tax-related," where digital files having the same category are accessible as a group in the financial management application (102).

The digital files may take many different forms. For example, the digital files may include web pages, emails, scanned documents, digital photographs, audio recordings, portable document format (PDF) files, text messages from mobile devices, or any other types of digital files that may include financial data. The import engine (112) may be configured to import the digital files from a variety of sources, such as web pages, email clients, file system folders, image management applications, network shares, or any other location where digital files may be stored.

Further, digital files imported into the financial management application (102) may include many different types of financial data. For example, a digital file may be a receipt (e.g., an online payment confirmation in the form of a web page or email, or a scan or digital photograph of a paper receipt), a financial statement (e.g., an account summary or earnings statement), a bill (e.g., an energy bill or a telephone bill), or a medical statement (e.g., a doctor's bill or insurance statement). For purchases of products, digital files may also include warranties or instruction manuals. Though not strictly financial, the latter types of digital files may nonetheless be associated with records (for example, financial transactions) managed by the financial management application (102). The aforementioned types of financial data are provided as examples only. A digital file may include many different types of financial data that are not explicitly disclosed herein but nonetheless fall within the scope of the invention.

As noted above, the financial management application (102) is configured to link digital files to records. In one or more embodiments of the invention, the financial management application (102) uses an import engine (112) to link digital files to records based on metadata describing the digital files, as described herein. Specifically, the import engine (112) may be configured to parse a digital file to obtain the metadata, import the digital file into the financial management application (102), identify a record in the financial management application (102) that is associated with the digital file, link the digital file to the record and/or other operations involving the digital file.

Many different types of metadata may be obtained from a digital file, depending on the type of file and the contents therein. For example, metadata may include the file extension, the file size, the date and/or time the file was created, the naming convention used for the file, the format of the file contents (e.g., hypertext markup language (HTML), extensible markup language (XML), comma-separated values, or any other type of identifiable format), the colors (if applicable) of elements in the file, specific images included in the file (for example, a company logo), keywords in the file (for example, company names, product names, finance-related terms, or any other type of keyword), a uniform resource locator (URL) where the file was obtained, an email address from which the file originated, or any other type of identifiable metadata.

With respect to the format of the contents of the file, metadata may also identify specific structures, such as a specific stylesheet or XML schema. In other words, the digital file may conform to a predetermined file specification. In one or more embodiments of the invention, the file specification is provided to the import engine (112) by the entity that generated the digital file. For example, the entity that generated the digital file may be a business using a proprietary file format for digital files of a particular type. Alternatively, the file specification may be provided by the same entity that produced the import engine (112). Specifically, the entity that produced the import engine (112) may publish a digital file specification, and other entities may generate digital files using that specification to help facilitate importing the digital files into the financial management application (102). As another alternative, the file specification may be provided by another entity altogether (i.e., neither the entity that generated the digital file nor the entity that produced the import engine (112)).

The aforementioned types of metadata are provided as examples only. A digital file may include many different types of metadata that are not explicitly disclosed herein but nonetheless fall within the scope of the invention.

In one or more embodiments of the invention, the import engine (112) is a module within the financial management application (102) itself. Alternatively, the import engine (112) may be a module operating outside of the financial management application (102). For example, as discussed below, the import engine (112) may be part of a web browser plug-in or indexing engine.

As noted above, in one or more embodiments of the invention, the import engine (112) is part of a web browser plug-in. Specifically, in one or more embodiments of the invention, the import engine (112) is configured to import data from web pages into the financial management application (102). For example, the web browser plug-in may include a user-selectable button configured to initiate the import engine (112). In other words, the import engine (112) may be configured to import the currently displayed web page into the financial management application (102) when a user selects the button. For the purposes of this discussion, a "web page" may refer to any type of digital file displayed using a web browser. For example, web pages may include hypertext, XML, images, portable document format (PDF) files, text documents, or any other type of digital file that may be displayed using a web browser.

Further, the import engine (112) may be configured to proactively parse web pages as they are loaded in the web browser, to determine whether the web pages include financial data. For example, the import engine (112) may be configured to identify when monetary amounts are displayed on the web page, or whether the web page includes phrases such as "amount paid," "tax," "please print this page for your records," or any other phrases typically associated with financial data. Many different properties of a digital file may be used to determine that the digital file includes financial data.

In one or more embodiments of the invention, the web browser plug-in is configured to generate an alert when the import engine (112) determines that a web page includes financial data. As one example, the alert may take the form of an icon or other indicator associated with the web browser plug-in. As another example, the alert may take the form of a dialog box with a message such as "This web page appears to be a payment confirmation. Would you like to import it into your financial management application?" The specific message used may vary depending on the specific implementation and/or the type of digital file encountered. Based on the alert, a user may initiate the import engine (112) (for example, using a user-selectable button as discussed above) to import the web page into the financial management application (102).

As noted above, in one or more embodiments of the invention, the import engine (112) is part of an indexing engine (not shown). An indexing engine is a hardware and/or software component configured to create an index of digital files stored on a user's computer system. For example, in many cases, an indexing engine operates by traversing a file system or a portion thereof. The indexing engine may be general (configured to index many different types of digital files) or specific (for example, configured to index only digital images, emails, or other specific types of digital files). In any case, the import engine (112) may be configured to parse digital files encountered by the indexing engine to identify whether the digital files include financial data. In one or more embodiments of the invention, the import engine (112) is configured to import digital files thus identified into the financial management application (102). Further, the import engine (112) may be configured to prompt a user before importing such digital files. For example, a list of the digital files may be presented to the user and the user may select which files to import into the financial management application (102).

Alternatively, the import engine (112) may be part of neither a web browser plug-in nor an indexing engine. For example, the import engine (112) may be a stand-alone application module configured to interface with the financial management application (102), and may include functionality for a user to "drag-and-drop" digital files for importing. Those skilled in the art, having the benefit of this disclosure, will appreciate that the import engine (112) may take many different forms, and many different techniques may be used to initiate importing a digital file by the import engine (112).

In one or more embodiments of the invention, when a digital file is imported into the financial management application (102), a user is prompted to choose with which record to link the digital file. Further, in one or more embodiments of the invention, the import engine (112) is configured to generate rules for processing digital files based on a combination of the user's actions and metadata describing the digital file. The import engine (112) may subsequently store the rules (not shown) in a rules repository (110) and use the rules to automatically process digital files that are encountered in the future. In one or more embodiments of the invention, the rules repository (110) is specific to an individual user of the financial management application (102), and the rules are applied only to digital files for that user. Alternatively, the rules repository (110) may be a "communal" repository, where the rules are shared among multiple users on the same computer system and/or on different computer systems. Examples of rules for processing digital files are discussed in detail below.

Further, in one or more embodiments, the system includes a search mechanism (not shown) for querying digital files linked to the user account (104), financial account (106), and/or financial account (108). Specifically, the search mechanism may allow for a user to search for keywords associated with the digital files. For example, the user may be able to search for the name of a business located on a receipt or bill, the name of a doctor, a date or date range, or any other type of information associated with the various types of digital files discussed herein. The search mechanism may be configured to generate a report based on the search criteria provided by the user, where the report lists digital files that match the search criteria. For example, the report may be presented in a webpage or window of a desktop application. In one or more embodiments of the invention, the search mechanism is a built-in feature of the financial management application (102). Alternatively, the search mechanism may be part of a third-party application, such as a desktop search tool.

Figure 2:
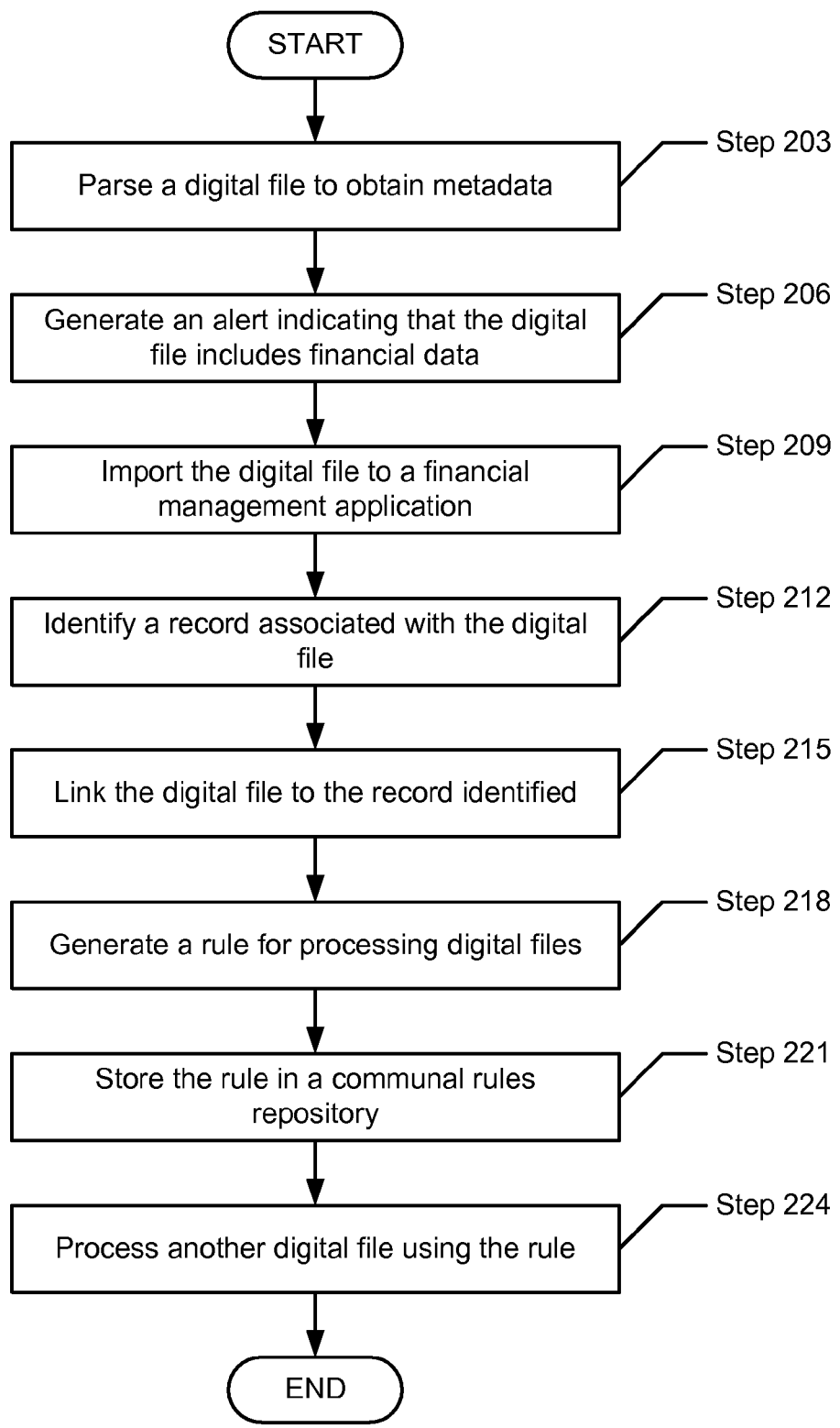
FIG. 2 shows a flowchart of a method for managing financial data in accordance with one or more embodiments of the invention.

FIG. 2 shows a flowchart of a method for managing financial data in accordance with one or more embodiments of the invention. In one or more embodiments of the invention, one or more of the steps shown in FIG. 2 may be omitted, repeated, and/or performed in a different order than the order shown in FIG. 2. Accordingly, embodiments of the invention should not be considered limited to the specific arrangement of steps shown in FIG. 2.

In one or more embodiments of the invention, in Step 203, a digital file that includes financial data is parsed to obtain metadata describing the digital file. If the parsing occurs automatically (for example, using a proactive web browser plug-in or indexing engine), the metadata may be used to determine that the digital file includes financial data. Further, in Step 206, an alert may be generated indicating that the digital file includes financial data. In one or more embodiments of the invention, the form of the alert may vary depending on the implementation.

In one or more embodiments of the invention, in Step 209, the digital file is imported into a financial management application. If an alert was generated in Step 206, the importing may be performed in response to a user action taken based on the alert. In one or more embodiments of the invention, digital files imported into the financial management application are placed in a file bucket, as discussed below with respect to FIG. 3. Alternatively, the use of a file bucket may be omitted.

In one or more embodiments of the invention, in Step 212, a record associated with the digital file is identified. Specifically, the record is identified based on a comparison of records managed by the financial management application with metadata obtained from the digital file. As one example, if the metadata include the name of a user account, the name may be matched with a user account managed by the financial management application. As another example, if the metadata include a financial account number (for example, a checking account number, savings account number, or credit card number), the balance may be matched with the number of a financial account managed by the financial management application. As yet another example, if the metadata include an amount of a financial transaction, the amount may be matched with a financial transaction managed by the financial management application. Many different comparisons of this type may be used to identify a record associated with the digital file.

In one or more embodiments of the invention, in Step 215, the digital file is linked to the record identified in Step 212. Further, in one or more embodiments of the invention, in Step 218, a rule for processing digital files is generated based on how the digital file was linked in Step 215. Specifically, the rule may be generated based on metadata included in the digital file that was linked and decisions made by a user with respect to which record to use.

As one example, a rule may indicate that digital files containing a certain company logo should be linked to financial accounts (for example, in the case of a scanned bank statement). As another example, a rule may indicate that digital files using a particular file format should be linked to financial transactions (for example, in the case of records retrieved from a bank in a predefined XML format). Many different types of rules may be generated, using many different types of metadata and combinations thereof.

In Step 221, the rule may then be stored in a communal rules repository. The rules repository is referred to as "communal" because the rules may be used to process digital files of many different (or a community of) users. Thus, the rules repository essentially allows for knowledge about different types of digital files to be shared among many users of the financial management application. Specifically, in Step 224, another digital file may be processed using the rule stored in Step 221. That is, in one or more embodiments of the invention, if metadata of the new digital file match metadata described in the rule, the rule may be used to process the new digital file. Because the rule has already been approved by a user (i.e., the user for whom the rule was generated), user intervention may no longer be necessary when processing digital files that match the rule.

Figure 3:
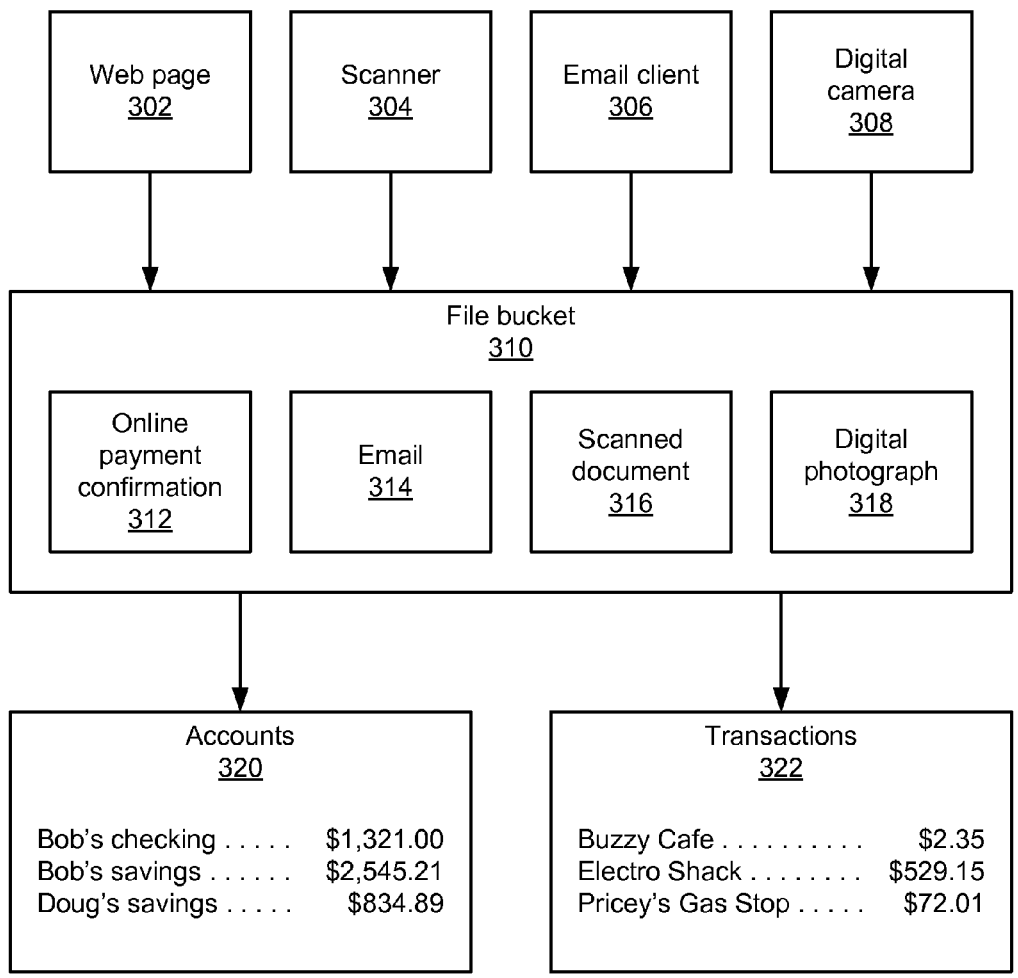
FIG. 3 shows examples of managing financial data in accordance with one or more embodiments of the invention.

FIG. 3 shows examples of managing financial data in accordance with one or more embodiments of the invention. Specifically, FIG. 3 shows a variety of examples that represent multiple ways of managing financial data. Embodiments of the invention may implement some, all, or none of these examples. Accordingly, it should be understood that FIG. 3 is provided for exemplary purposes only, and should not be construed as limiting the scope of the invention.

As shown in FIG. 3, digital files may be obtained from a web page (302), a scanner (304), an email client (306), and/or a digital camera (308). When the digital files are encountered on a computer system (for example, by an import engine as discussed above), the digital files are parsed to obtain metadata describing the digital files. Digital files that include metadata are then stored in a file bucket (310). The file bucket (310) is a general repository for digital files within a financial management application (not shown) that have not yet been linked to any particular records. The file bucket (310) may be associated with a visual interface accessible to users, or may simply be a backend construct (for example, a table in a database) used by the financial management application. Examples of digital files stored in the file bucket (310) may include, for example, an online payment confirmation (312), an email (314), a scanned document (316), and/or a digital photograph (318). Many different types of digital files may be stored in the file bucket (310).

Digital files stored in the file bucket (310) may subsequently be linked to particular records in the financial management application. As one example, a scanned copy of an account statement may be linked to one of several accounts (320) managed by the financial management application (in this example, "Bob's checking," "Bob's savings," or "Doug's savings"). In this example, if the account statement includes the account number of "Bob's savings," the account statement is linked to that account.

As another example, a digital copy of a receipt may be linked to a line item representing one of several transactions (322) managed by the financial management application (in this example, payments made to "Buzzy Café," "Electro Shack," and "Pricey's Gas Stop"). In this example, if the receipt includes a payment amount of $529.15, the digital copy of the receipt is linked to the line item for the payment to "Electro Shack."

Although accounts (320) and transactions (322) are illustrated separately in FIG. 3, in one or more embodiments of the invention, a digital file may be linked to both an account and a transaction. For example, as discussed above with respect to FIG. 1, a financial account may include a financial transaction. A digital file linked to the financial transaction may also be linked to the financial account. In one or more embodiments of the invention, the linking is done sequentially. In other words, the digital file may be linked to a financial account first, and then to a financial transaction included in the financial account.

Embodiments of the invention allow for many different types of financial data to be managed by a financial management application. Specifically, digital files that include financial data are linked to records in a financial management application, thereby making the financial data accessible in a relevant context. Further, embodiments of the invention use electronic tools (for example, a web browser plug-in or an indexing engine) to facilitate obtaining and importing the digital files into the financial management application. These tools may function proactively to help identify digital files that include financial data, thereby helping users to identify and organize financially relevant information. Moreover, embodiments of the invention may generate rules as digital files are processed, thereby increasing the autonomy of the system. In one or more embodiments of the invention, these rules are shared among multiple users, so that each user's actions may enhance the experience of other users as well.

Figure 4:
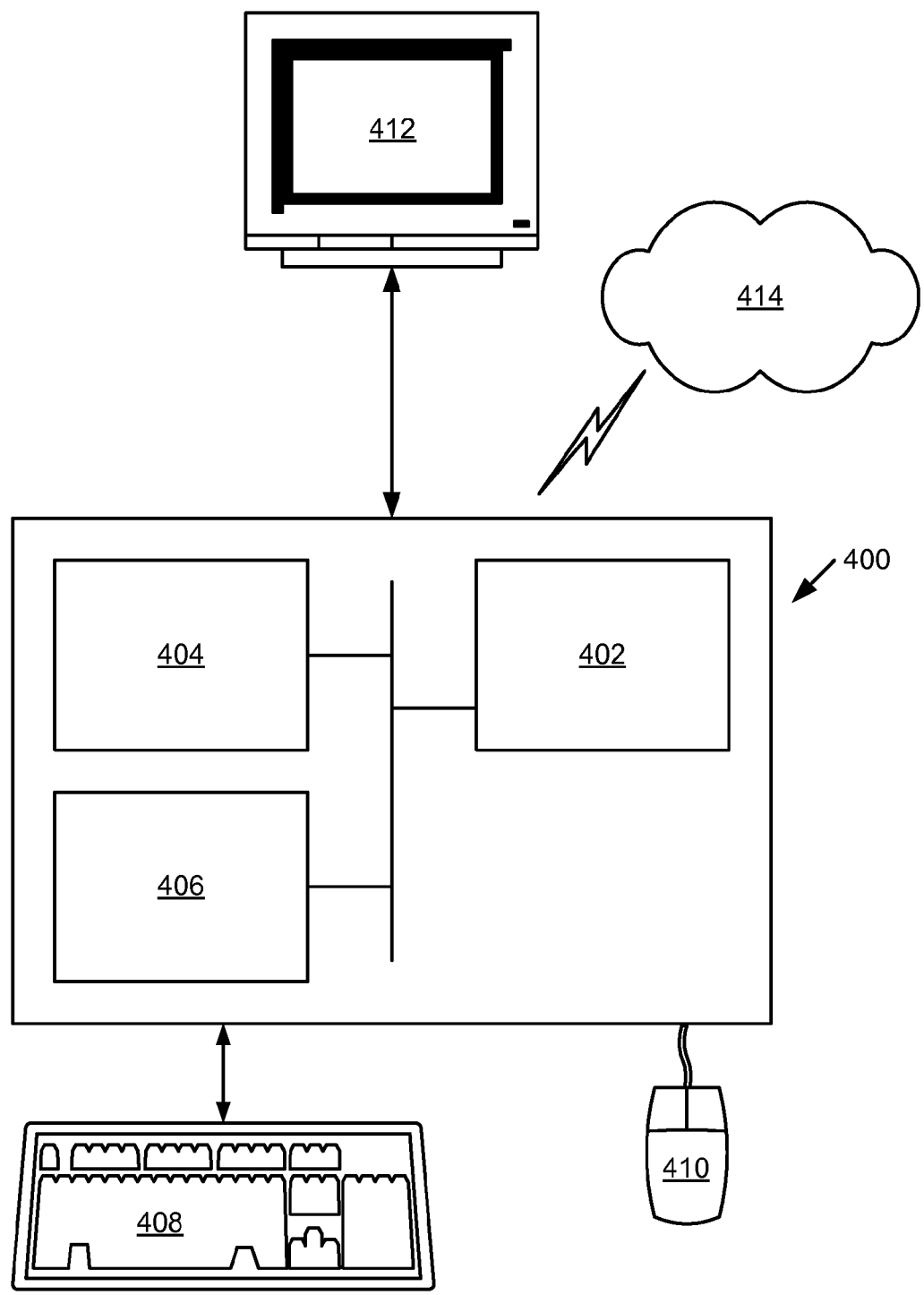
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., financial management application, user account, financial account, financial transaction, rules repository, import engine, digital files, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing financial data comprising: obtaining, from a website of a merchant and using a plug-in to a web browser, a first digital file comprising a list of purchased items and a purchase amount, wherein the first digital file corresponds to a purchase made on the website and paid for by a credit card; sending, using the plug-in, the first digital file to an indexing engine, wherein the indexing engine is configured to parse the first digital file, and wherein the indexing engine is configured to determine that the first digital file comprises financial data; importing, into a financial management application (FMA) executing on a processor, a financial institution (FI) transaction corresponding to the purchase from an issuing financial institution of the credit card; importing the first digital file into the FMA; matching, within the FMA, the purchase amount to a financial amount in the FI transaction by: comparing a name of the user account with metadata describing the first digital file; and comparing a balance of the financial account with metadata describing the first digital file; linking, after matching the purchase amount to the financial amount, the first digital file to the FI transaction in the FMA; generating a rule for processing digital files based on linking the first digital file to the FI transaction; storing the rule in a communal rules repository accessible to a plurality of users of the FMA; and processing a second digital file using the rule.

2. The method of claim 1, wherein processing the second digital file comprises linking the second digital file to a record in the FMA.

3. The method of claim 1, further comprising:
identifying a uniform resource locator (URL) of the first digital file, wherein the rule is based on the URL.

4. The method of claim 1, further comprising: identifying a filename format of the first digital file, wherein the rule is based on the filename format.

5. The method of claim 1, wherein the first digital file comprises a keyword, and wherein the rule is based on the keyword.

6. The method of claim 1, wherein the indexing engine is for indexing at least one selected from a group consisting of an email account and a file system.

7. The method of claim 1, further comprising:
generating, by the plug-in, an alert indicating that the first digital file comprises financial data, wherein importing the first digital file to the FMA is performed based on a user action taken in response to the alert.

8. The method of claim 1, wherein parsing the first digital file is performed using a predetermined file specification provided by an entity that generated the first digital file.

9. The method of claim 1, wherein the FI transaction is in a user account managed by the FMA.

10. The method of claim 1, wherein the FI transaction is in a financial account managed by the FMA.

11. The method of claim 1, wherein the FI transaction is associated with a category of financial data.

12. The method of claim 11, wherein the category is tax-related financial data.

13. A computer system comprising: a processor; a memory operatively connected to the processor; an indexing engine comprising functionality to: parse a first digital file to extract a purchase amount; and determine that the first digital file comprises financial data; a rules repository accessible to a plurality of users of a financial management application (FMA); and a plurality of software instructions stored in the memory and comprising functionality to: obtain, from a website of a merchant and using a plug-in to a web browser, the first digital file comprising a list of purchased items and the purchase amount, wherein the first digital file corresponds to a purchase made on the website and paid for by a credit card; send, using the plug-in, the first digital file to an indexing engine; import, into the FMA, a financial institution (FI) transaction corresponding to the purchase from an issuing financial institution of the credit card; import the first digital file into the FMA; match, within the FMA, the purchase amount to a financial amount in the FI transaction by: comparing a name of the user account with metadata describing the first digital file; and comparing a balance of the financial account with metadata describing the first digital file; link, after the purchase amount is matched to the financial amount, the first digital file to the FI transaction; generate a rule for processing digital files based on linking the first digital file to the FI transaction; store the rule in the rules repository; and process a second digital file using the rule.

14. A computer readable medium comprising a plurality of executable instructions for managing financial data under control of a processor, the plurality of executable instructions comprising functionality to: obtain, from a website of a merchant and using a plug-in to a web browser, a first digital file comprising a list of purchased items and a purchase amount, wherein the first digital file corresponds to a purchase made on the website and paid for by a credit card; send, using the plug-in, the first digital file to an indexing engine, wherein the indexing engine is configured to parse the first digital file, and wherein the indexing engine is configured to determine that the first digital file comprises financial data; import, into a financial management application (FMA), a financial institution (FI) transaction corresponding to the purchase from an issuing financial institution of the credit card; import the first digital file into the FMA; match, within the FMA, the purchase amount to a financial amount in the FI transaction by: comparing a name of the user account with metadata describing the first digital file; and comparing a balance of the financial account with metadata describing the first digital file; link, after the purchase amount is matched to the financial amount, the first digital file to the FI transaction; generate a rule for processing digital files based on linking the first digital file to the FI transaction; store the rule in a communal rules repository accessible to a plurality of users of the FMA; and process a second digital file using the rule.

* * * * *